(12) United States Patent
Fehrenbach et al.

(10) Patent No.: US 7,114,380 B2
(45) Date of Patent: Oct. 3, 2006

(54) METHOD FOR DETERMINING AND COMPENSATING THE GEOMETRIC ERRORS OF A ROTARY ENCODER

(75) Inventors: Hermann Fehrenbach, Rülzheim (DE); Carsten Hohmann, Karlsruhe (DE)

(73) Assignee: Fraunhofer Gesellschaft zur Förderung der Angewandten Forschung E.V., Munich (DE)

( * ) Notice: Subject to any disclaimer, the term of this patent is extended or adjusted under 35 U.S.C. 154(b) by 40 days.

(21) Appl. No.: 10/502,278

(22) PCT Filed: Jan. 15, 2003

(86) PCT No.: PCT/EP03/00367

§ 371 (c)(1),
(2), (4) Date: Feb. 15, 2005

(87) PCT Pub. No.: WO03/062620

PCT Pub. Date: Jul. 31, 2003

(65) Prior Publication Data

US 2005/0120784 A1   Jun. 9, 2005

(30) Foreign Application Priority Data

Jan. 24, 2002 (DE) .............................. 102 02 688
Apr. 19, 2002 (DE) .............................. 102 17 560

(51) Int. Cl.
*G01M 15/00* (2006.01)
(52) U.S. Cl. ................. 73/117.3; 73/117.2; 73/116
(58) Field of Classification Search ........ 73/116–117.4
See application file for complete search history.

(56) References Cited

U.S. PATENT DOCUMENTS

| | | | | | |
|---|---|---|---|---|---|
| 5,623,412 | A | * | 4/1997 | Masson et al. | ............. 701/101 |
| 5,703,283 | A | * | 12/1997 | McClish et al. | ............... 73/116 |
| 5,906,652 | A | * | 5/1999 | Remboski et al. | ........... 701/110 |
| 6,655,205 | B1 | * | 12/2003 | Bartelt et al. | ................. 73/162 |

FOREIGN PATENT DOCUMENTS

| | | | |
|---|---|---|---|
| DE | 195 40 674 A1 | 5/1997 |
| DE | 196 22 042 A1 | 12/1997 |
| DE | 100 17 107 A1 | 10/2001 |

* cited by examiner

*Primary Examiner*—Edward Lefkowitz
*Assistant Examiner*—Jermaine Jenkins
(74) *Attorney, Agent, or Firm*—Antonelli, Terry, Stout and Kraus, LLP

(57) ABSTRACT

A method is described for determining geometric errors of a rotary encoder with a plurality of increments that can be registered by a sensor, encoder being applied to an internal combustion engine and being mounted on a shaft which can be directly or indirectly set in motion by gas moments and moments of inertia. The invention profile of the angular velocity $\omega_{mess}(t)$ of the shaft is measured for a time-variable shaft speed, that the shaft speed signals obtained during the measurement are averaged and that the averaging process is carried out within a shaft speed range in which the effects of the gas moments and moments of inertia, which act on the shaft in the internal combustion engine, on the angular velocity of the crankshaft cancel each other out statistically, at least to a great extent and that geometric errors of the rotary encoder are determined on the basis of the profile of the angular velocity $\omega_{mess}(t)$.

23 Claims, 2 Drawing Sheets

METHOD FOR DETERMINING AND COMPENSATING THE GEOMETRIC ERRORS OF A ROTARY ENCODER

TECHNICAL FIELD

The invention relates to a method for determining geometric errors of a rotary encoder with a plurality of increments that can be registered by a sensor, the encoder being applied to an internal combustion engine and being mounted on a shaft which can be directly or indirectly set in motion by gas moments and moments of inertia.

PRIOR ART

Increasingly high requirements with regard to comfort and reliability are imposed on modern internal combustion engines such as those used primarily in cars but also in other technical areas, for example, for power generation. Also, however, as a result of the exhaust gas standards which are becoming increasingly stringent, it is important to monitor the operating behavior of such engines as accurately as possible wherein it is of central importance to know the actual speed or the actual angular velocity of the crankshaft as accurately as possible. For the purposes of recording the angular velocity of the crankshaft, a rotary encoder or incremental encoder is mounted in an well known fashion on the crankshaft or the camshaft of the internal combustion engine in operative connection with the crankshaft, whose rotational speed is recorded by a receiving system operating in a contact-free fashion. The markings or increments present on the rotary encoder are typically recorded optically or inductively.

Rotary encoders are typically distinguished by a tooth pitch along their circumferential edge which provides a plurality of teeth, spaced in increments, preferably spaced the same distance apart. During rotation of such a rotary encoder, a time sequence of measurement pulses which depends on the angular velocity of the rotary encoder is produced in the receiving system with reference to which measures can be obtained for the actual angular velocity of the shaft connected to the rotary encoder.

However, rotary encoders have unavoidable errors which can be attributed to manufacturing errors, such as for example non-uniform tooth or incremental pitch or errors caused by assembly such as for example non-centric mounting of the rotary encoder on the shaft to be measured.

Such errors result in intolerable deviations in the highly accurate determination of the angular velocity of the crankshaft so that it is important to minimize the influence of errors or completely eliminate them.

In the attempt to reduce or compensate for such errors, some attempts at obtaining a solution are known although these are merely unsatisfactory.

DE 196 22 448 A1 discloses a speed recording method for the detection of misfiring in which the speed behavior of the crankshaft is recorded in pre-determined angular ranges and is defined as a measure for unevenness of rotation. Correction values are determined by comparing the unevenness of rotation determined with a pre-determined reference value which is used as the basis for further recording of the speed and its correction. In this case, however, only a segment-wise, cylinder-specific correction of the speed signal takes place.

Similarly, in a method for correcting tolerances of an indicating wheel according to DE 197 33 958 A1, individual measured values are compared with a reference value to determine suitable correction values used as the basis for accurately determining the shaft speed. In this case also, merely a segment-wise correction of the speed signal is made with low angular resolution.

In both the aforesaid cases, exact knowledge of the respective internal combustion engines is required to determine the reference values necessary to determine the correction values.

A method for evaluating the output signals of a revolution rate sensor can also be deduced from DE 42 10 933 A1 wherein respectively a plurality of counting increments of a rotary encoder located on the shaft are summarized to determine the revolution rate of a shaft so that the angular resolution with which the angular velocity of the rotary encoder is recorded ultimately decreases with increasing size of the sectorial region of the rotary encoder which contains the counting increments for the measurement. In addition, this method requires threshold value specifications specific to the engine or rotary encoder which assume a preliminary knowledge of the system which is as accurate as possible.

SUMMARY OF THE INVENTION

The invention is a method for determining geometric errors of a rotary encoder with a plurality of increments that can be registered by a sensor for an internal combustion engine providing an extremely accurate error determination using the simplest possible correction means. In particular, the method determines geometric errors in an incrementally resolved fashion without the need to assume any preliminary information on the internal combustion engine or the rotary encoder.

The invention is a method for determining geometric errors of a rotary encoder with a plurality of increments that can be registered by a sensor, the encoder being for an internal combustion engine and being mounted on a shaft which can be directly or indirectly set in motion by gas moments and moments of inertia, comprises a profile of the angular velocity of the shaft being measured for a time-variable shaft speed and shaft speed signals obtained during the measurement, which are synchronous in a working cycle, are averaged.

With averaging, care should be taken to ensure that the averaging process is carried out within a shaft speed range in which the effects of the gas moments and moments of inertia, which act on the shaft in the internal combustion engine, cancel each other out statistically, at least to a great extent.

The method according to the invention advantageously uses the anti-phase property of the gas moments and moments of inertia and their influence on the speed of the crankshaft in order to be able to determine and compensate for the geometric errors of the rotary encoder.

In a preferred variant of the method of the invention, the time behavior of the shaft speed or the angular velocity of the crankshaft or of the camshaft kinematically connected to the crankshaft of an internal combustion engine is observed with the aid of a rotary encoder and a corresponding receiving system during a so-called coast-down test, that is, the internal combustion engine is abruptly stopped after reaching a high speed or its highest speed or the fuel supply is abruptly interrupted. As a result of the internal friction moments of the engine, the speed is reduced continuously until the combustion engine comes to a stop.

Bearing in mind that in an internal combustion engine operated at high speeds, the effects of the moments of inertia originating from the oscillating components on the crankshaft dominate compared with those of the gas moments, that is the moments originating from the compression and expansion of the fuel-air mixture (or the air in thrust operation) and conversely at low speeds the influence of the gas moments dominates compared with those of the moments of inertia on the crankshaft, during the coast-down test the internal combustion engines passes through a speed range in which the effects of the moments of inertia and the gas moments compensate for one another.

Precisely this speed range is used to determine the geometric errors of a rotary encoder, which however, alternatively to the aforesaid coast-down test, is also obtained in the course of so-called towing or compression tests in which in the same way, the effects of the moments of inertia and gas moments on the crankshaft or crankshaft speed cancel each other out statistically, at least to a large extent. If the respective internal combustion engine is an internal combustion engine with an odd number of cylinders, as a result of the symmetry relationships in these engines, the requirement for largely statistical equal distribution of the effects of gas moments and moments of inertia on the crankshaft angular velocity is not absolutely essential since the speed signal of two successive rotations of a working cycle can be described as anti-phase from the start in such engines. Thus, in this case any measurement is suitable as a basis for adapting the encoder.

BRIEF DESCRIPTION OF THE DRAWINGS

The determination of the geometric error of a rotary encoder can be specified in detail as follows with reference to the figures without restricting the general inventive idea. In the figures.

DETAILED DESCRIPTION OF THE INVENTION

Figure 1:
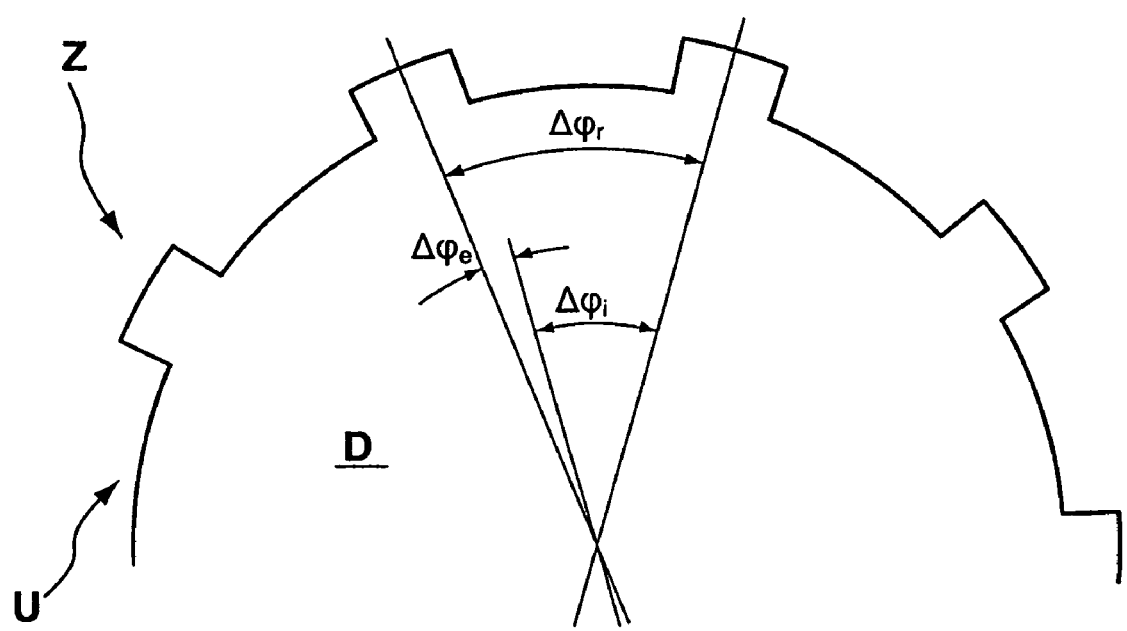
FIG. 1 is a schematic diagram of a rotary encoder showing half.

Starting from the rotary encoder D, of which half is shown schematically in FIG. 1 and whose circumferential edge U has a plurality of individual teeth Z arranged preferably at the same distance from one another, the following notation to which reference is made subsequently is introduced. It is assumed that a circular measure $\Delta\phi_r(z)$ relevant for measuring the angular increment, also designated as an angular increment of the real rotary encoder, is composed of a fraction $\Delta\phi_i$ which corresponds to the division of a rotary encoder assumed as ideal and an error $\Delta\phi_e(z)$ dependent on the respective angular increment. In this context it is assumed that the angular increment which can be registered by a sensor corresponds to the center-to-center distance between two teeth Z arranged adjacently along the circumferential edge U of the rotary encoder D. Thus, the angular increment which can actually be registered is:

$$\Delta\phi_r(z) = \Delta\phi_i(z) + \Delta\phi_e(z).$$

In order to determine the incremental error $\Delta\phi_e(z)$ dependent on each tooth or increment, it was thus necessary to determine $\Delta\phi_r(Z)$ provided that it is assumed that the value for the ideal incremental division $\Delta\phi_i$ is assumed to be known.

Figure 2:
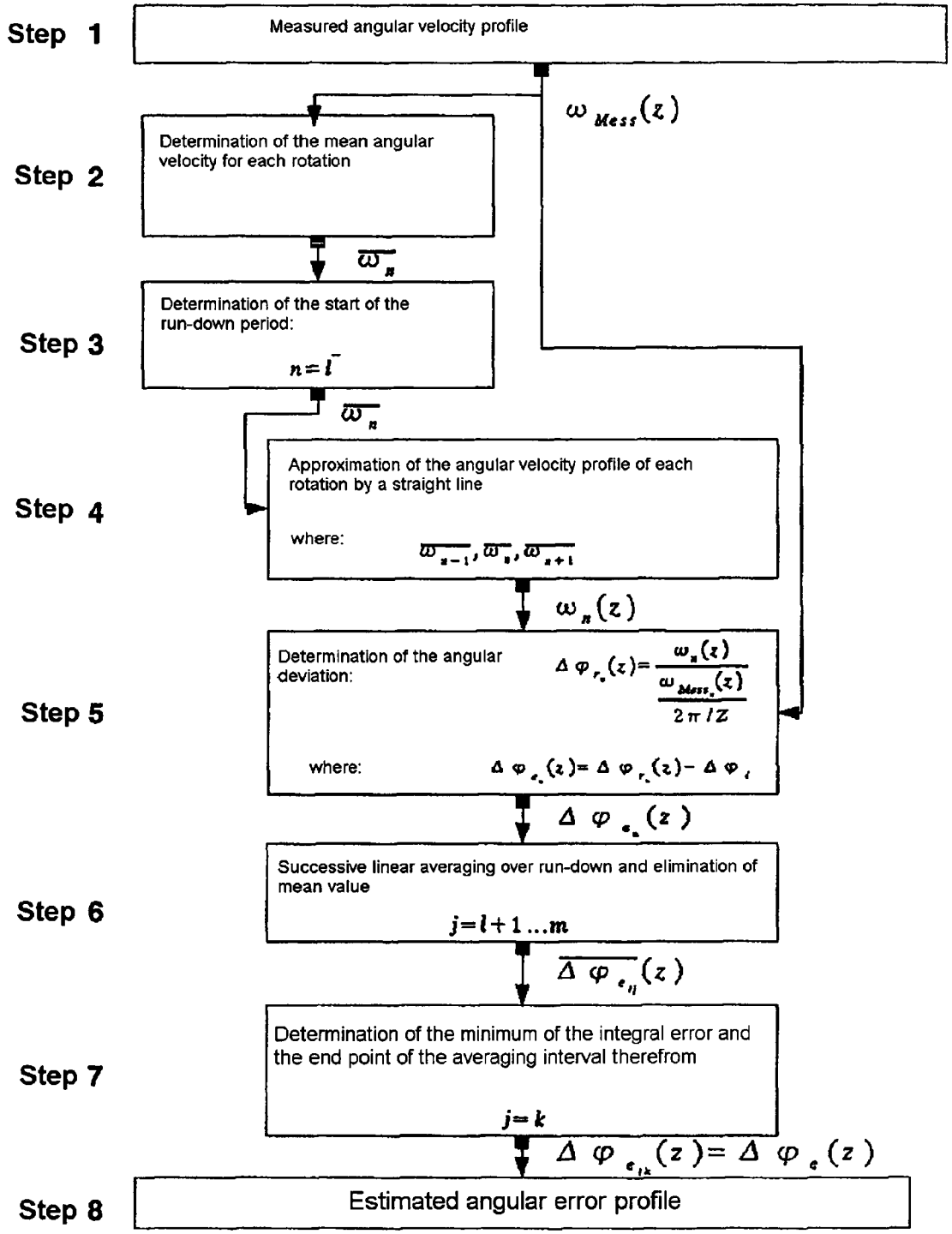
FIG. 2 is a schematic flow diagram of the determination of geometric errors.

Starting from the preceding reasoning, the following individual process steps are to be carried out to determine the geometric errors, whose schematic sequence can be deduced from FIG. 2. It is first necessary to measure the angular velocity using the incremental rotary encoder together with receiver (Step 1). As a result of the measurement, a time-dependent angular velocity signal $\omega_{mess}(Z)$ is obtained on which basis a mean angular velocity $\overline{\omega}_n$ per shaft rotation is calculated at least approximately (Step 2). The registered time $\Delta t_n$ which the rotary encoder requires for a complete rotation is taken as the basis to determine $\overline{\omega}_n$. It is thus obtained for $\overline{\omega}_n$:

$$\overline{\omega}_n = \frac{360°}{\Delta t_n}$$

On the basis of the preceding relationship, the corresponding mean angular velocity $\overline{\omega}_n$ is calculated for each rotation n of a speed range being considered. For the case described previously where a coast-down test is carried out using an internal combustion engine, this means calculating the mean angular velocity $\overline{\omega}_n$ for each rotation n of the internal combustion engine, beginning with the highest speed and ending with the stopping of the internal combustion engine (Step 3). Using the mean angular velocity $\overline{\omega}_n$ per rotation n thus determined, a mean angular velocity profile is constructed, which is approximated as a polyline, whose slope for the rotation n is obtained from the mean angular velocity $\overline{\omega}_{n-1}$ of the preceding rotation and the angular velocity $\overline{\omega}_{n+1}$ of the following rotation (step 4).

The mean angular velocity profile obtained using the preceding straight-line approximation can moreover advantageously be adapted by means of a suitable polynomial whereby the accuracy for an estimate of the actual mean speed profile can be improved. In this way, the angular velocity profile $\omega_n(z)$ per revolution n is obtained for each individual tooth Z or each increment as a desired speed profile by directly obtaining the increment(z)-related angular velocity $\omega_n(z)$ as a function value of the function described by the polynomial.

On the basis of the angular velocity profile $\omega_n(z)$, the real angular increment $\Delta\phi_{r_n}(z)$ for each rotation n is subsequently calculated for each individual tooth as follows (step 5):

$$\Delta\phi_{r_n}(z) = \frac{\omega_n(z)}{f_{Zahn_n}(z)} = \frac{\omega_n(z)}{\frac{\omega_{mess_n}(z)}{2\pi/z}}$$

On the basis of the tooth or increment frequency $f_{Zahn_n}$ recorded by measuring techniques per rotation (available as a measured value for each rotary encoder increment or each tooth per rotation), which is given as a ratio to the calculated desired speed $\omega_n(z)$, it is possible to obtain the angular increment $\Delta\phi_{r_n}$ which can be determined per rotation and is affected by errors, from which the fraction of the ideal incremental division $\Delta\phi_i(z)$ must finally be subtracted to calculate the actual geometric angular error $\Delta\phi_e(z)$: $\Delta\phi_e(z) = \Delta\phi_{r_n}(z) - \Delta\phi_i(z)$.

Since the calculation of the angular error profile $\Delta\phi_e(z)$ described previously is based on calculating the mean angular velocity profile $\omega_n(z)$ however, the speed fluctuations caused by the cyclic operating mode of the internal combustion engine which ultimately originate from the interplay of the moments of inertia and gas moments acting on the crankshaft, are initially also interpreted as angular errors.

The speed fluctuations based on the moments of inertia and gas moments incorrectly enter into the preceding considerations for determining the geometric error $\Delta\phi_e(z)$ because of the previous averaging to calculate the angular velocity profile $\omega_n(z)$. In order to eliminate or largely eliminate this influence, averaging, preferably linear averaging, is carried out over the estimated angular error profiles $\Delta\phi_e(z)$ per rotation for a certain speed range of the coast-down test in which the signal fractions attributed to the gas moments and moments of inertia compensate for one another. The following formula relationship (step 6) is obtained for this linear averaging:

$$\Delta\varphi_{e_n}(z) = \frac{1}{k-l}\sum_{n=1}^{k}\left[\frac{\omega_n(z)}{f(z)} - \Delta\varphi_i(z)\right]$$

where $\Delta\phi_{en}(z)$ is the incremental angular error per rotation
$\omega_n(z)$ is the incremental angular velocity per rotation
$f(z)$ is the increment frequency
$\Delta\phi_i(z)$ is the angular increment for ideal increment
k, l are the rotation indices for lower and upper speed limit The upper and lower speed limits relevant for the linear averaging (rotation indices k and l) are selected such that the effects of the moments of inertia and gas moments on the crankshaft which cause the aforesaid speed fluctuations, behave in phase opposition to one another within the speed range considered so that the signal fraction obtained herefrom is determined approximately.

Two different methods can be used in order to find the optimum averaging limits k, l (Step 7):

1. When carrying out a coast-down test, initially a surge speed is sought for which a phase shift occurs in the shaft speed signal caused by a change in dominance between gas moments and moments of inertia. The speed range now to be specified, within which the linear averaging is performed, is obtained by a suitable symmetrical or asymmetric specification of specific numbers of rotations before and after the surge speed such that an alternating component contained in the speed signal is as small as possible after the averaging. Ideally, symmetrical speed limits could be selected about the located surge speed but as a result of the different amplitudes of the alternating component of the speed signal depending on the respective rotation n, an individual choice of limits is mostly required.

2. Another possibility for selecting the speed limits is first determining the incremental angular error $\Delta\phi_{en}(z)$ starting from a certain starting point l as a function of the end point k. It is now necessary to select that speed range in which the angular error is the smallest. If the angular error profile is plotted for example relative to a zero line, the suitable interval limits should be selected about that region in which the surface enclosed by the angular error profile with the zero line is the smallest. If the interval is wrongly selected, still visible signal fractions of the gas moments and moments of inertia are present in the estimated angular error. However, these signal fractions result in an enlargement of the area. The determination of the interval limits based on the graphical consideration is suitable both for manual and a computer-assisted automatic execution.

In an automatic determination of interval limits, a "starting speed" is first determined, more suitable before the beginning of the coast-down test at the highest speed. The linear averaging is then carried out starting from this "starting speed", keeping step with each rotation. In this way, a family of averaged estimated angular error profiles is obtained for each rotation n. At the end of the coast-down test a suitable angular error profile is calculated which encloses the smallest area with the zero line described previously. The same procedure can be repeated many times to optimize the "starting speed" and the "end speed".

By means of the linear averaging described previously, any useful signal fractions falsifying the error calculations which cause an alternating fraction in the angular velocity profile dependent on the system, can be largely reduced if not completely eliminated. As a result a highly precise error definition is obtained for each individual increment of the rotary encoder per rotation. Possible influences from the measurement receiver which falsify the error determination if present, can be compensated and suitably taken into account.

The geometric error of a rotary encoder determined using the previous method is advantageously used to correct or compensate when determining the speed of internal combustion engines using incremental rotary encoders. Thus, the compensated angular velocity profile $\omega_{comp}$ of the rotation of a crankshaft of an internal combustion engine recorded using a rotary encoder is obtained as follows (step 8):

$$\omega_{comp} = \frac{\Delta\varphi_r(z)}{f_{Zahn}(z)}$$

Alternatively to the coast-down test explained previously in which a combustion engine is switched off after reaching a maximum speed and the speed behaviour is measured until it stops, any other measurement conditions in which a sufficiently large variation in the phase relationship between the moments of inertia and gas moments occurs can be used as the basis for determining the geometric error. At this point mentioning is made of alternative towing and compression tests as well as idling measurement at high speed. However coast-down tests are an ideal measuring mode because of the lack of combustion and they are easy to carry out.

However, if the combustion engines to be studied comprise engines with an odd number of cylinders, as a result of the symmetry relationships, any measurement is suitable as the basis for adaptation of the encoder, since in these engines the speed signal relating to two successive rotations of a working cycle can be designated as phase opposition.

REFERENCE LIST

D Rotary encoder
Z Tooth, increment
U Circumferential edge

The invention claimed is:

1. A method for determining geometric errors of a rotary encoder with a plurality of increments that can be registered by a sensor, the encoder being for an internal combustion engine and being mounted on a shaft which can be directly or indirectly set in motion by gas moments and moments of inertia, comprising:

measuring a profile of angular velocity $\omega_{mess}(t)$ for a time-variable shaft speed, averaging the shaft speed signals obtained during the measurement and the averaging process being carried out within a shaft speed range in which effects of the gas moments and the moments of inertia, which act on the shaft in the internal combustion engine, on angular velocity substantially cancel each other out statistically, and the geometric errors of the rotary encoder are determined on a basis of the profile of the angular velocity $\omega_{mess}(t)$.

2. The method according to claim 1, wherein a mean angular velocity $\overline{\omega}_n$ per shaft rotation n is calculated at least substantially on a basis of measurement of the profile of the angular velocity $\omega_{mess}(t)$.

3. The method according to claim 2, wherein an increment and a related angular velocity $\overline{\omega}_R(z)$ is calculated at least substantially from a mean angular velocity $\omega_R$.

4. The method according to claim 3, wherein a profile of the increment z and related angular velocity $\omega_n(n)$ are represented by a polynomial.

5. The method according to claim 4, wherein the increment z and related angular velocity $\omega_n(z)$ is obtained as a function value of a function described by the polynomial.

6. The method according to claim 5, wherein the averaging is a linear averaging which is carried out over the increment z related angular velocities $\omega_n(z)$ per increment z and shaft rotation n on a basis of a relationship which gives an incremental angular error per rotation as geometric error:

$$\Delta\varphi_{e_n}(z) = \frac{1}{k-l}\sum_{n=1}^{k}\left[\frac{\omega_n(z)}{f(z)} - \Delta\varphi_i(z)\right]$$

where $\Delta\phi_{en}(z)$ incremental angular error per rotation
$\omega_n(z)$ incremental angular velocity per rotation
$f(z)$ increment frequency
$\Delta\phi_i(z)$ angular increment for ideal increment
k, l rotation indices for lower and upper speed limit.

7. The method according to claim 5, wherein the time-variable shaft speed is obtained as part of one of a coast-down, a towing or a compression test.

8. The method according to claim 5, wherein the speed range within which the effects of the gas moments and moments of inertia on the shaft angular velocity cancel each other out statistically, is selected such that an incremental angular error $\Delta\phi_{en}(z)$ is determined as a function of the shaft speed and that a speed range in which the angular error is smallest is selected.

9. The method according to claim 3, wherein the time-variable shaft speed is obtained as part of one of a coast-down, a towing or a compression test.

10. The method according to claim 4, wherein the time-variable shaft speed is obtained as part of one of a coast-down, a towing or a compression test.

11. The method according to claim 2, wherein the time-variable shaft speed is obtained as part of one of a coast-down, a towing or a compression test.

12. The method according to claim 1, wherein the increment z and related angular velocity $\omega_n(z)$ is calculated from at least two calculated mean angular velocities $\overline{\omega}_{n-1}$ and $\overline{\omega}_{n+1}$.

13. The method according to claim 12, wherein a profile of the increment z and related angular velocity $\omega_n(n)$ are represented by a polynomial.

14. The method according to claim 13, wherein the increment z and related angular velocity $\omega_n(z)$ is obtained as a function value of a function described by the polynomial.

15. The method according to claim 14, wherein the time-variable shaft speed is obtained as part of one of a coast-down, a towing or a compression test.

16. The method according to claim 13, wherein the time-variable shaft speed is obtained as part of one of a coast-down, a towing or a compression test.

17. The method according to claim 12, wherein the averaging is a linear averaging which is carried out over the increment z and related angular velocities $\omega_n(z)$ per increment z and shaft rotation n on a basis of a relationship which gives an incremental angular error per rotation as geometric error:

$$\Delta\varphi_{e_n}(z) = \frac{1}{k-l}\sum_{n=1}^{k}\left[\frac{\omega_n(z)}{f(z)} - \Delta\varphi_i(z)\right]$$

where $\Delta\phi_{en}(z)$ incremental angular error per rotation
$\omega_n(z)$ incremental angular velocity per rotation
$f(z)$ increment frequency
$\Delta\phi_i(z)$ angular increment for ideal increment
k, l rotation indices for lower and upper speed limit.

18. The method according to claim 17, wherein the time-variable shaft speed is obtained as part of one of a coast-down, towing or compression test.

19. The method according to claim 12, wherein the time-variable shaft speed is obtained as part of one of a coast-down, a towing or a compression test.

20. The method according to claim 1, wherein the time-variable shaft speed is obtained as part of one of a coast-down, a towing or a compression test.

21. The method according to claim 1, wherein the shaft speed range within which the effects of the gas moments and moments of inertia on the shaft speed cancel each other out statistically, are selected such that initially a surge speed is sought for which a phase shift occurs in the shaft speed signals caused by a change in dominance between gas moments and moments of inertia, with the speed range being selected about the surge speed such that an alternating component obtained in the speed signal is as small as possible after averaging.

22. A method according to claim 1, wherein for an internal combustion engine having an odd number of cylinders, an arbitrary speed range is used to measure the angular velocity when determining the geometric errors.

23. A method for compensating for geometric errors of a rotary encoder with a plurality of increments that are registerable by a sensor, the encoder being for an internal combustion engine and being mounted on a shaft which can be directly or indirectly set in motion by gas moments and moments of inertia, comprising the geometric error being determined according to claim 1 and an incremental angular geometric error $\Delta\phi_{en}(z)$ being obtained and used for correction when determining the speed of the internal combustion engine.

* * * * *